No. 873,904. PATENTED DEC. 17, 1907.
E. SCHNEIDER.
APPARATUS FOR MEASURING THE ANGLES OF SIGHT.
APPLICATION FILED APR. 15, 1907.

Witnesses:
Gustave R. Thompson
Ruth C. Fitzhugh

Inventor:
Eugene Schneider
by
Mauro, Cameron, Lewis Massie
attys.

UNITED STATES PATENT OFFICE.

EUGENE SCHNEIDER, OF LE CREUSOT, FRANCE.

APPARATUS FOR MEASURING THE ANGLES OF SIGHT.

No. 873,904.     Specification of Letters Patent.     Patented Dec. 17, 1907.

Application filed April 15, 1907. Serial No. 368,278.

*To all whom it may concern:*

Be it known that I, EUGENE SCHNEIDER, resident of Le Creusot, Saône-et-Loire, in the Republic of France, have invented a new and useful Apparatus for Measuring Angles of Sight, which invention is fully set forth in the following specification.

The present invention relates to apparatus for measuring vertical angles, that is to say, angles of sight. The term angle of sight used by artillerists indicates the angle between the line of sight and the horizontal.

The apparatus fulfils the same requirements as the clinometer or eclimeter used in topography to measure the inclination of a line proceeding from the apparatus. The arrangement of the instrument allows the images of a vertical graduation and of the bubble of a level to be brought into juxtaposition with the object or target.

In order that my invention may be clearly understood, and readily carried into effect, I will describe the same more fully with reference to the accompanying drawing, in which:—

Figure 2:
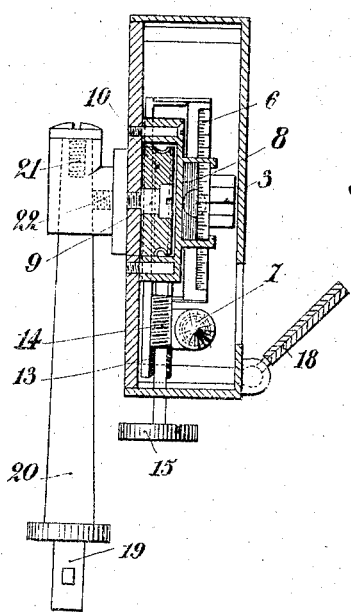
Figure 1:
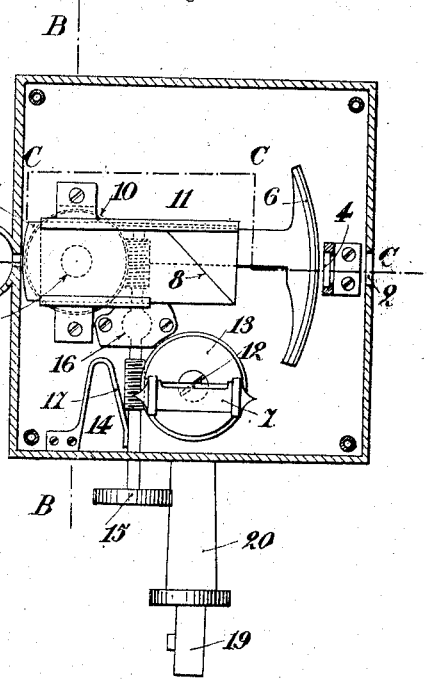
Figure 3:
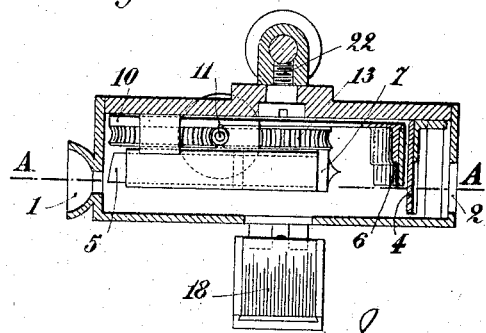

Figure 1 is a longitudinal sectional elevation on the line A—A of Fig. 3. Fig. 2 is a cross section on the line B—B of Fig. 1. Fig. 3 is a sectional plan on the line C—C of Fig. 1.

Aim is taken at the object or target directly through the eye-piece 1 and the opening 2. By inclining the instrument forward or backward the image of a line 3 drawn on a mirror 4 is seen through the lens 5, on a level with the object and is superposed in the pupil on the image of the object viewed directly. The said lens 5 which is preferably a segmental lens permits a graduation 6 marked on a cylindrical mirror to be seen and also the bubble of a level 7 viewed by reflection upon the separation surface 8 of two mirrors, which surface has been covered for a portion of its width with a slight deposit of silver, as indicated by the vertical hatching in Fig. 2. The graduated mirror 6 is adapted to be rotated around a spindle 9 by means of a gear wheel 10, which meshes with an endless screw 11. In the same way the level 7 is adapted to be rotated about a spindle 12 by means of a gear wheel 13 and of an endless screw 14. The endless screws 11 and 14 are controlled by the same milled knob 15. They are formed with threads of the same pitch, and which also run in the same direction.

Assuming the apparatus to be directed upon the object, and that this object is for example lower than the observer, the bubble will be at the rear extremity of the level. It is seen after reflection above the horizontal line 3. By turning the knob 15, the level may be rendered horizontal, thereby bringing the image of the bubble onto the line 3. At the same time the graduation 6 is displaced through the same angle, and when the bubble has been caused to show on the line 3, the division of the graduation 6 which is opposite the line 3 indicate the angle of sight sought. The level and the graduated mirror are turned in the opposite direction in order that the positive angles may be read above zero. In order to take up the play which may eventually occur in the gearing, the two endless screws 11 and 14 are adapted to be rocked around a ball and socket joint 16 under the influence of a spring 17. The openings in the casing are glazed in order to exclude dust. The level 7 may be illuminated by the reflection of the light of the sky upon a small mirror 18 which may be adjusted in any direction.

The apparatus may be held in the hand or placed upon a support of any kind, such as a tripod, a sword, or a stick adapted to receive it. The support need only be provided with a socket adapted to receive the part 19 and form a bayonet joint. When the rod 20 has been fixed to the support, the apparatus may be given all possible movements relatively to this rod by rotating it with slight friction around two spindles 21 and 22 at right angles, the latter spindle passing through the center of gravity of the apparatus.

1. In apparatus for measuring angles of sight or inclination, the combination of a revoluble graduated cylindrical mirror, a stationary mirror having thereon a guide mark in the line of sight, a liquid level revolubly mounted in the plane of the first-named mirror, a third mirror for reflecting an image of the level into the plane of sight, and means for simultaneously rotating said cylindrical mirror and level to bring an image of the bubble of the level into the line of sight with the guide-mark, object and graduation.

2. In apparatus for measuring angles of sight or inclination, the combination of a revoluble graduated cylindrical mirror, a stationary mirror having thereon a guide mark in the line of sight, a liquid level revolubly mounted in the plane of the first-named mirror, a third mirror for reflecting an image of the level into the plane of sight, means for simultaneously rotating said cylindrical mirror and level to bring an image of the bubble of the level into the line of sight with the guide-mark, object and graduation, and a segmental eye-piece for magnifying the graduations.

3. In an apparatus for measuring angles of sight or inclination, the combination of a revoluble graduated cylindrical mirror, a revoluble level in the plane of revolution of said mirror, a spring-pressed shaft having two worm gears and a ball and socket bearing intermediate the said gears to take up wear of the threads and gears meshing with said worms to rotate said mirror and level in opposite directions.

In testimony whereof I have signed this specification in the presence of two subscribing witnesses.

EUGENE SCHNEIDER.

Witnesses:
  DEAN B. MASON,
  N. DE LAGRANGE.